C. G. ROSS.
KNEADING AND MIXING MACHINE.
APPLICATION FILED JAN. 5, 1909.

950,243.

Patented Feb. 22, 1910.
3 SHEETS—SHEET 2.

WITNESSES
James P. Duhamel
Agnas L. Cluna

INVENTOR
Charles G. Ross
BY
J. Morris Wilson
ATTORNEY

C. G. ROSS.
KNEADING AND MIXING MACHINE.
APPLICATION FILED JAN. 5, 1909.
950,243.
Patented Feb. 22, 1910.
3 SHEETS—SHEET 3.
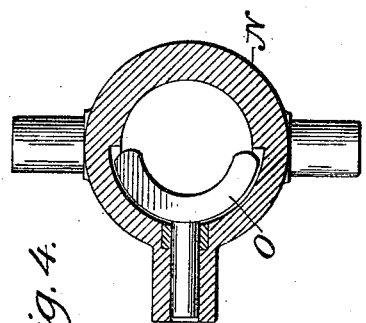
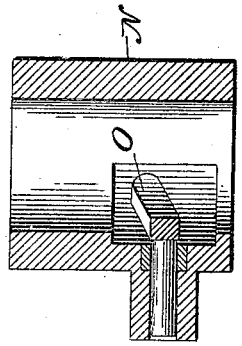
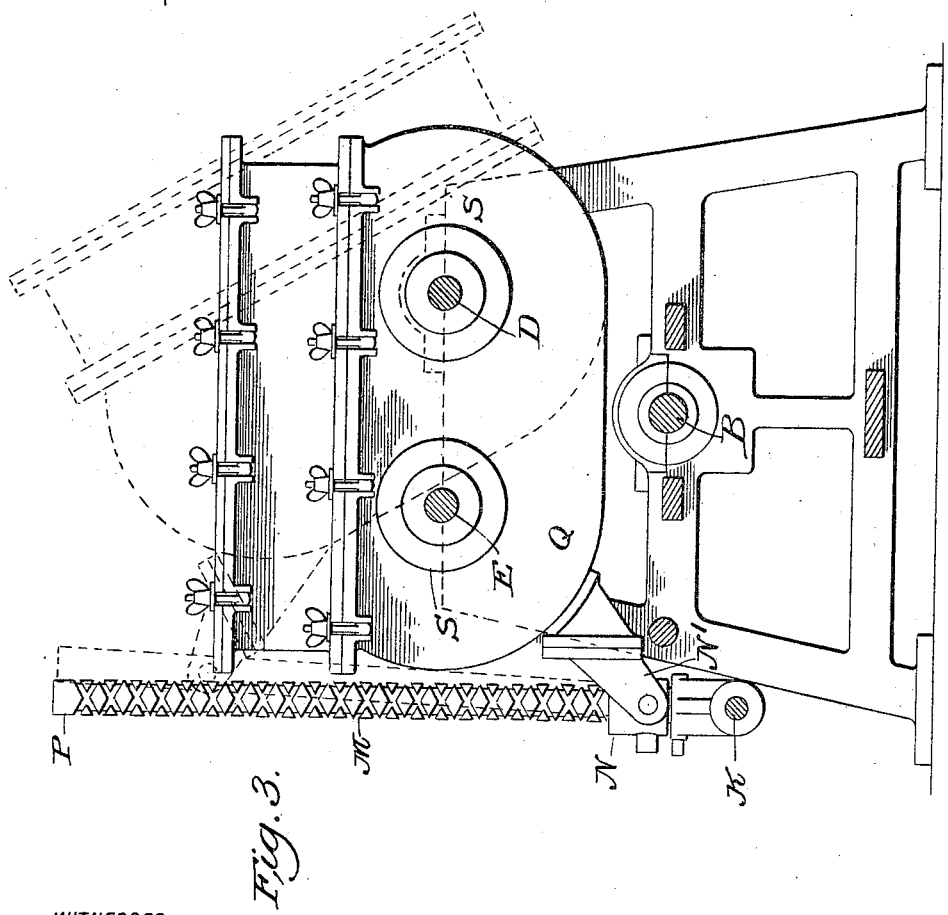
WITNESSES
INVENTOR
Charles G. Ross
BY
J. Morris Wilson
ATTORNEY

UNITED STATES PATENT OFFICE.

CHARLES G. ROSS, OF NEW YORK, N. Y.

KNEADING AND MIXING MACHINE.

950,243.  Specification of Letters Patent.  Patented Feb. 22, 1910.

Application filed January 5, 1909. Serial No. 470,870.

*To all whom it may concern:*

Be it known that I, CHARLES G. ROSS, a citizen of the United States, and a resident of the borough of Brooklyn, city of New York, county of Kings, and State of New York, have invented certain new and useful Improvements in Kneading and Mixing Machines, of which the following is a specification.

The invention relates to such improvements; and it consists of the novel construction and combination of parts hereinafter described and subsequently claimed.

The object of my invention is to provide a machine which can be economically constructed for the purpose of kneading and mixing inks, white lead, paints, wood fillers, macaroni, bread dough, cement, concrete, smokeless powder and any other materials of this nature with especial means by which when the mixing or kneading is completed the contents of the mixing trough can be dumped therefrom by an application of the same power which operates the mixing blades, without any danger of breakage caused by the trough moving too far in either an upward or downward direction. There has always been considerable trouble of this nature in connection with the devices in use heretofore as operators have frequently thrown in the power which operates the lifting or lowering of the trough and through carelessness or neglect have failed to take off or reverse the power when the base of the trough had reached its highest elevation or lowest depression thereby causing breakages and damage of a serious nature. In my invention the screw by which the base of the trough is lifted, revolves in one direction only and when the highest point of elevation is reached if the power is not shut off, the lifting nut automatically descends upon the rotating screw.

Reference may be had to the accompanying drawings and the letters of reference marked thereon which form a part of this specification. Similar letters refer to similar parts in the several figures therein.

Figure 1:
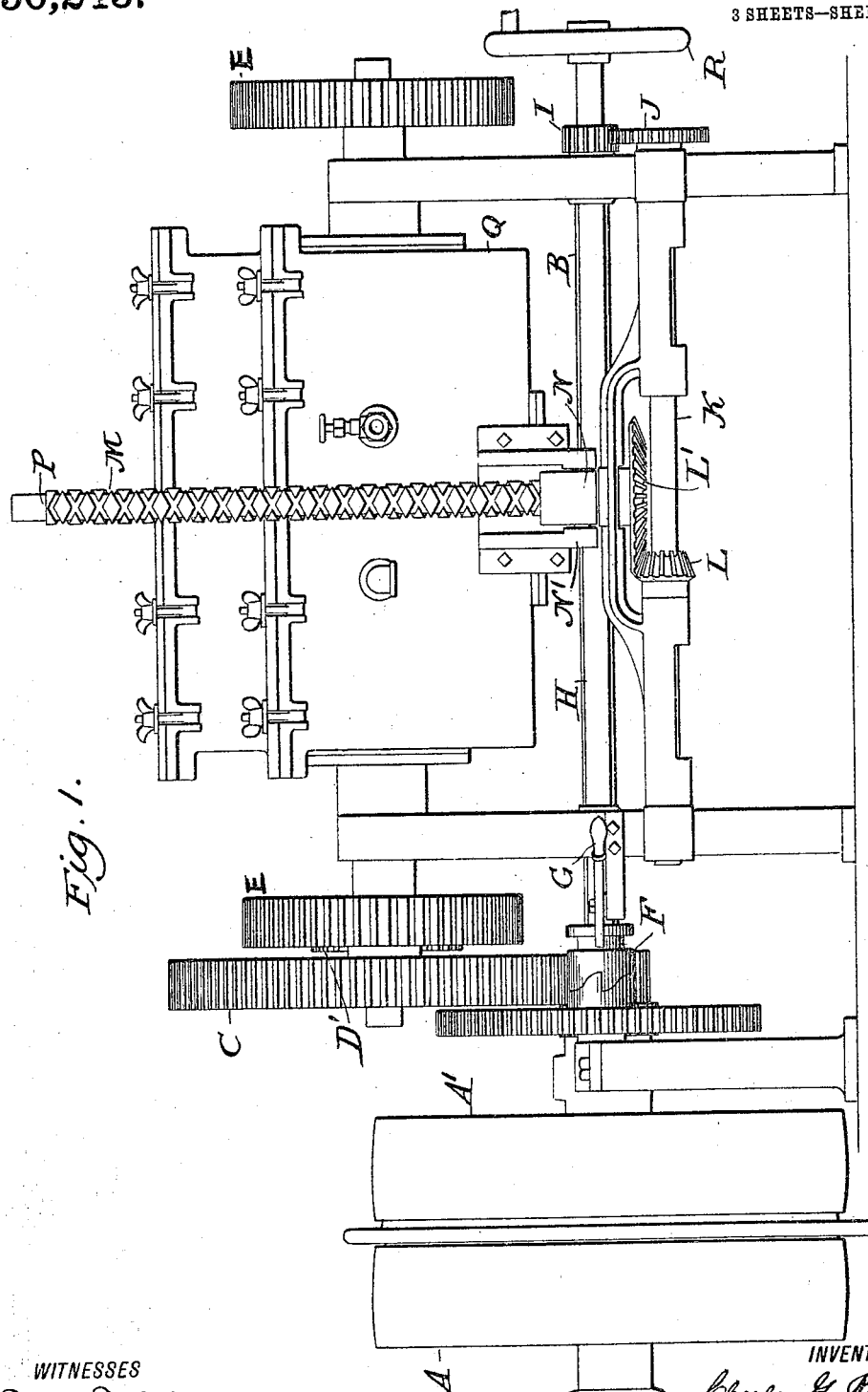
Figure 2:
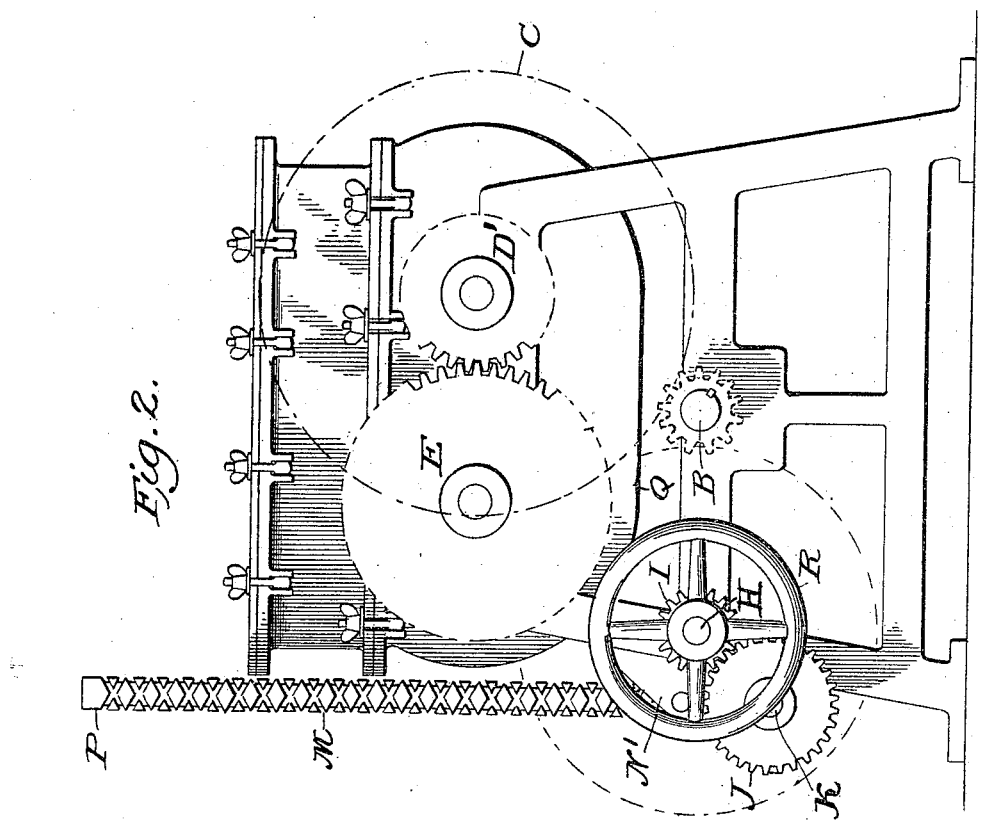

In the accompanying drawings, Figure 1 is a rear elevation of a machine constructed according to my invention; Fig. 2 is a side elevation showing the end of the machine on which the hand power gearing is attached. Fig. 3 is a side elevation of the opposite end of the machine with the parts extending beyond the frame removed and showing in dotted lines the trough tilted to dump the material which has been mixed. Fig. 4 is a horizontal sectional view of the lifting nut which encircles and traverses the double thread lifting screw, and Fig. 5 is a vertical sectional view of the same nut.

Referring to the accompanying drawings A and A' are double motion, friction driving pulleys attached to the main driving shaft B shown in Figs. 2 and 3, which revolves in bearings on the frame of the machine and engages with the toothed wheel C. The wheel C has a pinion D' adjacent to its hub which meshes with the spur gear E similar gearing D', E being provided at the other end of the trough, and the shafts, to which are attached the wheels D and E run through the mixing trough Q. Upon these shafts are rigidly attached mixing blades or paddles of the usual form, which are revolved in the trough Q and thoroughly knead and mix the mass contained therein.

F is a spiral jaw clutch, shown in Fig. 1 thrown in to engage the driving power, to revolve the shaft H, upon which the pinion I is placed, meshing with the gear J. This gear is rigidly attached to one end of the shaft K which carries the bevel gear L which meshes with the bevel gear L' and thereby revolves the double cross thread lifting screw M. As shown this screw is cut with right and left hand or cross threads.

N is a lifting nut encircling the screw M and pivotally attached to the bar N'. Inside the nut N is an internal adjustable thread O (shown in Fig. 4) which engages with the thread of the screw M when it revolves. The bar N' is also attached at one end to the trough Q so that when the screw M revolves and the nut N ascends the trough is tilted and the mass therein is emptied.

G is a lever by which the spiral jaw clutch F is thrown in and out of engagement with the driving power of the main shaft.

At the top of the screw M, the thread of the screw is cut so that the internal adjustable thread O in the lifting nut N when it reaches the point P on the ascent, engages the downward thread on M and if the power is not shut off and the revolutions of the screw M are not stopped the lifting nut N descends carrying with it the base of the mixing trough Q.

R is a small hand wheel which can be used to operate the means for turning the screw M if for any reason that method is preferable to applying the power.

In the operation of my invention the mass to be kneaded or mixed is placed in the trough Q and the cover thereon is securely fastened. The power is then turned on and the mixing or kneading blades inside the trough are revolved by the revolutions of the main driving shaft B which also drives the blades on the shaft to which the gear E is attached. When the mass in the mixing trough is thoroughly mixed the power driving the shaft B and the mixing blades is thrown off and the clutch lever G is thrown over so that the driving power revolves the shaft H. Through the gears I and J, the shaft K is revolved and through the bevel gears L and L' horizontal revolutions of the screw M are obtained. As the screw M revolves the lifting nut N ascends the screw M carrying in its ascent the base of the trough Q. If the operator desires to dump the mass in the mixing trough when the nut N has reached the proper point of elevation, the clutch lever G is thrown back, the spiral jaw clutch is disengaged and the movement of the nut N on the screw M ceases. The mixed mass is then emptied from the trough. If for any reason the clutch is not disengaged before the nut N reaches the point P on the screw M the internal adjustable thread O automatically descends when it touches the point P and a corresponding similar arrangement at the lowest point of the screw M automatically starts the ascent of the nut N when the lowest point of depression is reached. By this arrangement the operator can raise or lower the mixing trough at will when the pulleys driving the main shaft are running idle and the trough can be lowered from the dumping point without any change of gears or the throwing out of the clutch. The trough can also be stopped at any point in either the ascent or descent by throwing out the spiral jaw clutch F.

Having thus described my invention, what I claim as new and desire to secure by Letters Patent is as follows:

In a machine of the character described, the combination with a mixing trough and means for revolving the mixing blades therein; of means for emptying the mixing trough comprising a vertical, double cross threaded screw, a lifting nut encircling and traversing said screw and having an internal adjustable thread for engagement with the threads of said screw, means for horizontally revolving said screw, and means for reversing the direction of the movement of the lifting nut, at either end of the screw.

In witness whereof, I have hereunto set my hand this 16th day of December, 1908, in the presence of two subscribing witnesses.

CHARLES G. ROSS.

Witnesses:
AGNES L. CLUNE,
ANTHONY F. ARCOME.